United States Patent [19]
Fujii

[11] 4,367,927
[45] Jan. 11, 1983

[54] ZOOM LENS SYSTEM

[75] Inventor: Toru Fujii, Hino, Japan

[73] Assignee: Olympus Optical Co., Ltd., Tokyo, Japan

[21] Appl. No.: 200,576

[22] Filed: Oct. 24, 1980

Related U.S. Application Data

[63] Continuation of Ser. No. 924,439, Jul. 13, 1978, abandoned.

[30] Foreign Application Priority Data

Jul. 23, 1977 [JP] Japan ................... 52-87881

[51] Int. Cl.³ ............................................. G02B 15/14
[52] U.S. Cl. ................................................... 350/426
[58] Field of Search ............... 350/426, 448, 449, 450; 354/296

[56] References Cited

U.S. PATENT DOCUMENTS 3,918,798  11/1975  Takano ...................... 350/450 X
4,099,846   7/1978  Kawamura et al. ............ 350/426
4,153,338   5/1979  Fujii ........................... 350/426

Primary Examiner—John K. Corbin
Assistant Examiner—Scott J. Sugarman
Attorney, Agent, or Firm—Cushman, Darby & Cushman

[57] ABSTRACT

A zoom lens system comprising a flare stop and so adapted as to favorably limit rays which will otherwise produce flare without making light intensity insufficient by displacing said flare stop independently of displacements of lens groups for zooming.

3 Claims, 6 Drawing Figures

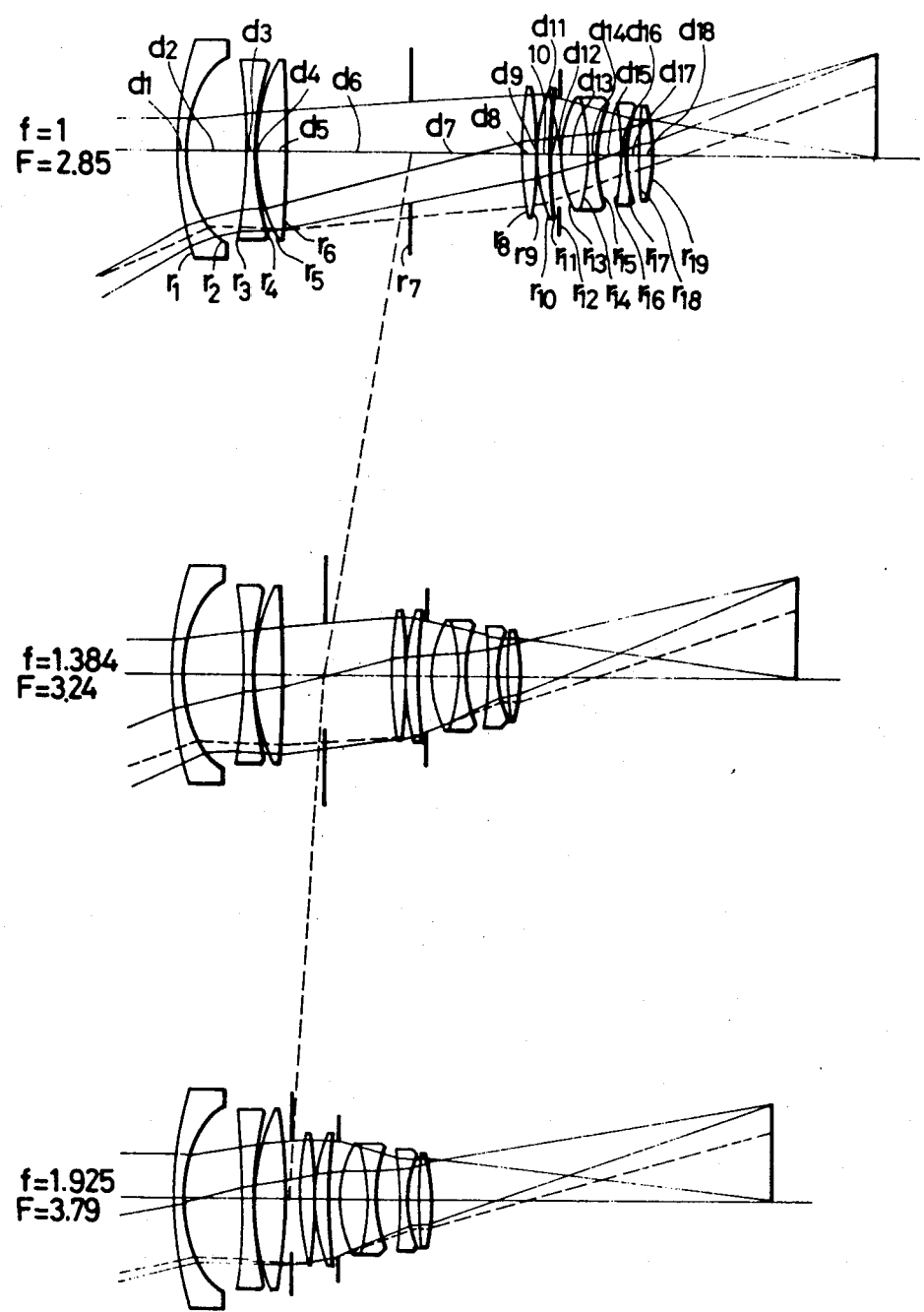

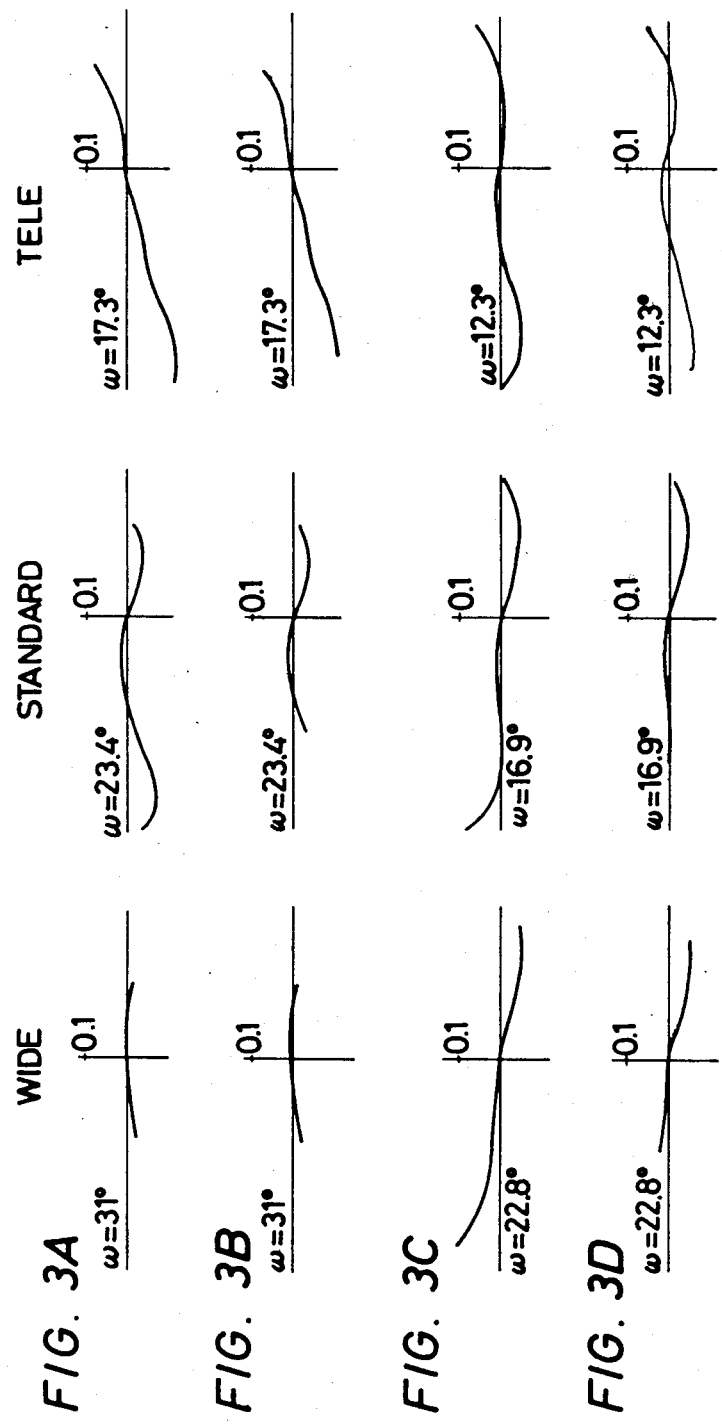

ZOOM LENS SYSTEM

This is a continuation of application Ser. No. 924,439 filed July 13, 1978, now abandoned.

BACKGROUND OF THE INVENTION

1. Field of the Invention

The present invention relates to a zoom lens system comprising a flare stop which is displaced in conjunction with zooming.

2. Description of the Prior Art

In designing a zoom lens system, it is a difficult problem to correct coma produced due to excessive intensity of marginal rays. Especially with the recent trend to design wide-angle zoom lens systems, there have been developed so-called retrofocus type zoom lens systems comprising a front negative focusing lens group and a rear imaging lens group. In such a type zoom lens system, pencils having passed through said focusing lens group are diverging and, therefore, paraxial pencil is inevitably incident on high portion of said rear imaging lens group. Further in such a retrofocus type zoom lens system, the pupil is generally located within the rear imaging lens group and, therefore, the offaxial lower pencil to reach the intermediate portion of the image is not limited at the portion where the paraxial ray is high. As a result, optical flare of the offaxial lower pencil is caused to make it difficult to obtain favorable performance of said zoom lens system. That is to say, though it is possible to limit the offaxial pencil having a large angle of field by diameter of the focusing lens group, the pencil having such an angle of field as to reach the intermediate portion of the image cannot be limited by a lens component other than that arranged in the vicinity of the pupil and, therefore, it was impossible to limit said pencil without minimizing the aperture ratio. Furthermore, it is well known that arranging a flare stop at a position far from the pupil is effective to make it possible to effectively control the offaxial pencil. In such a zoom lens system as is provided by the present invention especially of retrofocus type, however, a flare stop which is fixed to the focusing lens group or image-forming variable magnification lens group will be effectively operative at certain magnification levels but excessively limit the pencil to reduce intensity of the marginal pencil or limit the paraxial pencil itself at other magnification level. Such arrangement of a flare stop is therefore undesirable.

SUMMARY OF THE INVENTION

A general object of the present invention is to provide a zoom lens system comprising a flare stop so arranged as to be movable along the optical axis, and is so adapted as to correct flare without making light intensity insufficient by moving said flare stop independently of the displacement of the lens groups for zooming.

BRIEF DESCRIPTION OF THE DRAWINGS

FIG. 2 shows sectional views illustrating the composition of an embodiment of the present invention; and FIG. 3A, FIG. 3B, FIG. 3C and FIG. 3D show curves illustrating the coma characteristics of the embodiment shown in FIG. 2.

DETAILED DESCRIPTION OF THE PREFERRED EMBODIMENTS

Figure 1:
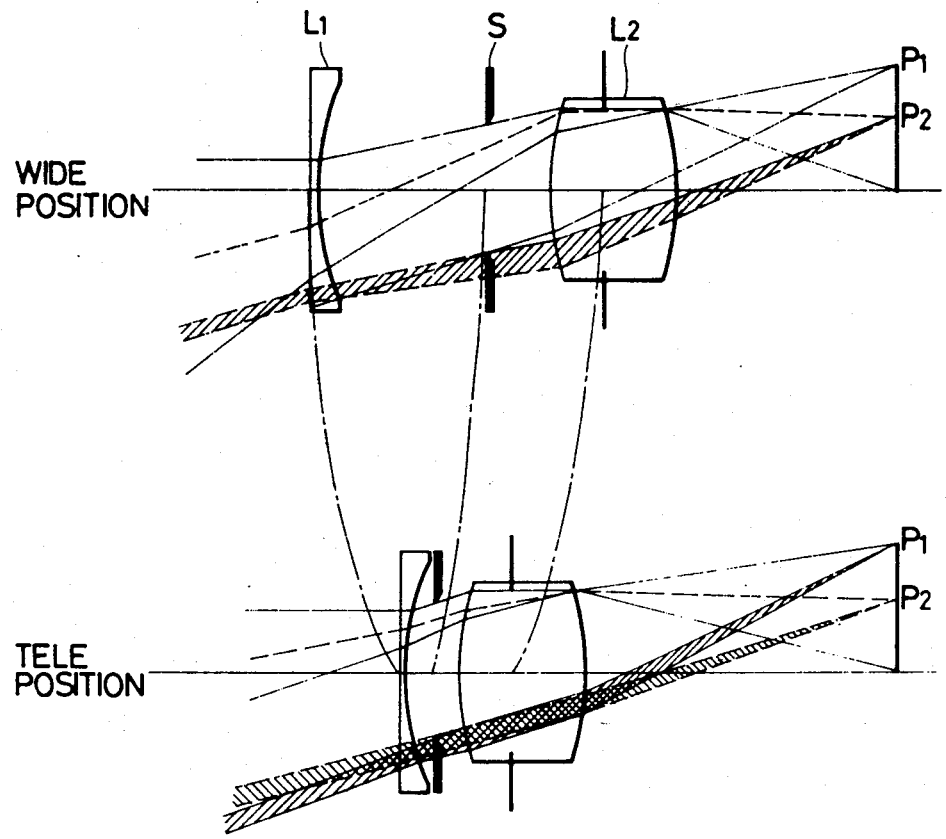
FIG. 1 shows sectional views illustrating an outline of the composition of the zoom lens system according to the present invention.

Now, the present invention will be described in detail with reference to the accompanying drawings. In FIG. 1, the upper sectional view shows the wide position of the lens system according to the present invention, and the lower sectional view illustrates the tele position of said lens system. In this figure, the reference symbol $L_1$ represents a front focusing lens group and the reference symbol $L_2$ designates a rear imaging variable-magnification lens group, and the lens system is so adapted as to perform zooming by displacing said lens groups along the chain lines respectively. In this wide-angle zoom lens system comprising the two lens groups having negative and positive powers respectively, a flare stop S is arranged in the position shown in the figure. Said flare stop S is so adapted as to be positioned at a rear position at the wide position of said lens system, and displaced to a front position when said lens system is set at its tele position. That is to say, the flare stop S is arranged so as to be positioned at the intersecting point of axial marginal pencil and lower pencil of the maximum field angle and have as its semi-diameter a length between the optical axis and intersecting point and interrupt only a part of lower pencil of the intermediate field angle to eliminate the flare at the wide position, and further arranged so as to have such magnitude as, touching the axial marginal pencil and interrupt a part of both lower pencils of the maximum and intermediate field angles to eliminate the flare at the tele position. Owing to such displacement of the flare stop S, the pencil having excessive intensity which is to reach the intermediate portion of the image and to produce flare due to coma, i.e. the pencil hatched in the figure, is interrupted by the flare stop S when said lens system is set at its wide position. However, the flare stop does not result in reduction of intensity of the marginal pencil which is often caused at the wide position of the conventional zoom lens system since said flare stop does not interrupt the pencils having large angles of field. On the other hand, the flare stop displaces gradually toward the front side as the lens system moves toward its tele position. At the tele position of the zoom lens system, the flare stop exhibits interrupting effect even to the pencils having large angles of field. At the tele position of the zoom lens system, the pencils are not generally determined by the front negative lens group but by the rear positive lens group, and therefore, intensity of the marginal pencil is increased in contrast to that at the wide position. Hence, it is possible to limit the excessive intensity of the marginal pencil by displacing the flare stop as illustrated in the lower sectional view shown in FIG. 1.

Now, a preferred embodiment of the present invention will be described below. It is a lens system having such a composition as shown in FIG. 2 and the following numerical data:

| Embodiment $f = 1 \sim 1.925$ | | |
|---|---|---|
| $r_1 = 1.865$ | | |
| | $d_1 = 0.05$ | $n_1 = 1.6583$ |
| $r_2 = 0.701$ | | |
| | $d_2 = 0.361$ | |
| $r_3 = -5.148$ | | |
| | $d_3 = 0.056$ | $n_2 = 1.7725$ |
| $r_4 = 1.741$ | | |

-continued

| | Embodiment f = 1 ~ 1.925 | |
|---|---|---|
| | $d_4 = 0.005$ | |
| $r_5 = 1.139$ | | |
| | $d_5 = 0.183$ | $n_3 = 1.66998$ |
| $r_6 = -8.879$ | | |
| | $d_6 = 0.722$ | |
| $r_7 = \infty$ | | |
| | $d_7 = 0.655$ | |
| $r_8 = 2.234$ | | |
| | $d_8 = 0.083$ | $n_4 = 1.6516$ |
| $r_9 = -5.963$ | | |
| | $d_9 = 0.004$ | |
| $r_{10} = 1.035$ | | |
| | $d_{10} = 0.083$ | $n_5 = 1.618$ |
| $r_{11} = 5.723$ | | |
| | $d_{11} = 0.056$ | |
| $r_{12} = \infty$ | | |
| | $d_{12} = 0.014$ | |
| $r_{13} = 0.736$ | | |
| | $d_{13} = 0.167$ | $n_6 = 1.58913$ |
| $r_{14} = -1.598$ | | |
| | $d_{14} = 0.042$ | $n_7 = 1.5927$ |
| $r_{15} = 0.807$ | | |
| | $d_{15} = 0.139$ | |
| $r_{16} = -2.193$ | | |
| | $d_{16} = 0.042$ | $n_8 = 1.7495$ |
| $r_{17} = 0.674$ | | |
| | $d_{17} = 0.072$ | |
| $r_{18} = 2.810$ | | |
| | $d_{18} = 0.083$ | $n_9 = 1.60342$ |
| $r_{19} = -8.522$ | | |

The numerical data shown above are defined for the lens system set at its wide position taking its focal length at this position as 1. The reference symbols $r_1$ through $r_{19}$ represent radii of curvature on the surfaces of the respective lens element (the reference symbols $r_7$ and $r_{12}$ represent radii of curvature on the flare stop and aperture stop respectively), the reference symbols $d_1$ through $d_{18}$ designate thicknesses of the respective lens elements and airspaces therebetween, and the reference symbols $n_1$ through $n_9$ denote refractive indices of the respective lens elements.

When zooming is performed by changing the airspace ($d_6+d_7$) between the front and rear lens groups of this lens system as shown in the figure, the flare stop is displaced as indicated by the chain line in the figure in conjunction with zooming but independently of the displacements of said lens groups, thereby correcting flare at each magnification level of said lens system. In such zooming operation, the position of the flare stop, i.e., the airspace $d_6$ between the lens surface $r_6$ and flare stop $r_7$ as well as the airspace $d_7$ between the flare stop $r_7$ and lens surface $r_8$ can be summarized as follows:

| | Wide position (f = 1) | Standard position (f = 1.384) | Tele position (f = 1.925) |
|---|---|---|---|
| $d_5$ | 0.722 | 0.183 | 0.042 |
| $d_7 =$ | 0.655 | 0.454 | 0.052 |

The coma characteristics of the embodiment are illustrated in FIG. 3A, FIG. 3B, FIG. 3C and FIG. 3D. FIG. 3A shows coma characteristics at the maximum angle of field at the wide position (f=1), standard position (f=1.384) and tele position (f=1.925) of the lens system which does not use the flare stop, FIG. 3B shows the coma characteristics at the same angle of field of the lens system using the flare stop, FIG. 3C shows the coma characteristics at the intermediate angle of field of the lens system which does not use the flare stop and FIG. 3D shows the coma characteristics at the intermediate angle of field of the lens system using the flare stop. The flare stop used in this embodiment had a diameter of 0.661. Though the flare stop was displaced in conjunction with zooming operation in the embodiment described above, it is possible not to interlock the flare stop with the lens groups but to position it quite independently.

Further, when the airspace between the front and rear lens groups is minimized in such a lens system as shown in the figure for enhancing zooming ratio, for example, it may be impossible to mechanically displace the flare stop to its optimum position. In such a case, it is necessary to arrange the flare stop S at a position on the side of the rear lens group as compared with the position shown in the lower sectional view of FIG. 1. However, a flare stop arranged at such a position will cause such inconvenience as to interrupt the paraxial pencil and, therefore, it will be preferable to design the flare stop so as to have a larger diameter. A similar measure can be considered at the wide position of the lens system. For example, it may be preferable to design a flare stop in such a way its diameter is variable for correcting flare more favorably. As is understood from the above descriptions, it is more preferable to design a flare stop so as to have a capability to change its diameter in addition to the capability to displace it in conjunction with the zooming operation. It will be possible to obtain a composition optimum for each type of lens system by combining the capability to displace the flare stop with that to change its diameter.

As is clear from the foregoing descriptions, the zoom lens system according to the present invention is capable of obtaining favorable images free from flare at any zoom positions owing to its capability to displace the flare stop comprised therein.

I claim:

1. A retrofocus type zoom lens comprising movable lens groups including a front negative focusing lens group and a rear positive imaging variable-magnification lens group, an aperture stop arranged in said rear positive lens group, and a flare stop arranged between said front negative lens group and said rear positive lens group, said movable lens groups being arranged so as to be displaced along the optical axis for zooming, said flare stop being arranged so as to be displaced in conjunction with zooming operation but independently of the displacements of said lens groups and arranged to eliminate the coma flare at the intermediate field angle, arranged so as to be positioned at the intersecting point of axial marginal pencil and lower pencil of the maximum field angle and have as its semi-diameter a length between the optical axis and intersecting point and interrupt only a part of lower pencil of the intermediate field angle to eliminate the flare at the wide position and arranged so as to have such magnitude as touching the axial marginal pencil and interrupt a part of both lower pencils of the maximum and intermediate field angles to eliminate the flare at the tele position.

2. A zoom lens system according to claim 1 wherein said front negative focusing lens group consists of a negative meniscus lens component, a negative lens component and a positive lens component, and said rear imaging variable-magnification lens group consists of a positive lens component, a positive meniscus lens component, a positive cemented lens component, a negative lens component and a positive lens component, and said lens system having the following numerical data:

| f = 1 ~ 1.925 | | |
|---|---|---|
| $r_1 = 1.865$ | | |
| | $d_1 = 0.05$ | $n_1 = 1.6583$ |
| $r_2 = 0.701$ | | |
| | $d_2 = 0.361$ | |
| $r_3 = -5.148$ | | |
| | $d_3 = 0.056$ | $n_2 = 1.7725$ |
| $r_4 = 1.741$ | | |
| | $d_4 = 0.005$ | |
| $r_5 = 1.139$ | | |
| | $d_5 = 0.183$ | $n_3 = 1.66998$ |
| $r_6 = -8.879$ | | |
| | $d_6 = 0.722$ | |
| $r_7 = \infty$ | | |
| | $d_7 = 0.655$ | |
| $r_8 = 2.234$ | | |
| | $d_8 = 0.083$ | $n_4 = 1.6516$ |
| $r_9 = -5.963$ | | |
| | $d_9 = 0.004$ | |
| $r_{10} = 1.035$ | | |
| | $d_{10} = 0.083$ | $n_5 = 1.618$ |
| $r_{11} = 5.723$ | | |
| | $d_{11} = 0.056$ | |
| $r_{12} = \infty$ | | |
| | $d_{12} = 0.014$ | |
| $r_{13} = 0.736$ | | |
| | $d_{13} = 0.167$ | $n_6 = 1.58913$ |

-continued

| f = 1 ~ 1.925 | | |
|---|---|---|
| $r_{14} = -1.598$ | | |
| | $d_{14} = 0.042$ | $n_7 = 1.5927$ |
| $r_{15} = 0.807$ | | |
| | $d_{15} = 0.139$ | |
| $r_{16} = -2.193$ | | |
| | $d_{16} = 0.042$ | $n_8 = 1.7495$ |
| $r_{17} = 0.674$ | | |
| | $d_{17} = 0.072$ | |
| $r_{18} = 2.810$ | | |
| | $d_{18} = 0.083$ | $n_9 = 1.60342$ |
| $r_{19} = -8.522$ | | | wherein the reference symbol f represents focal length of the lens system as a whole, the reference symbols $r_1$ through $r_{19}$ designate radii of curvature on the surfaces of the respective lens elements ($r_7$ and $r_{12}$ represent radii of curvature on the flare stop and aperture stop), the reference symbols $d_1$ through $d_{19}$ denote thicknesses of the respective lens elements and the airspaces formed therebetween and the reference symbols $n_1$ through $n_9$ represent refractive indices of the respective lens elements.

3. A zoom lens system according to claim 1 wherein said flare stop is so adapted as to be changeable in its diameter.

* * * * *